INVENTOR.
RICHARD L. PERL
BY
Oberlin, Maky & Donnelly
ATTORNEYS

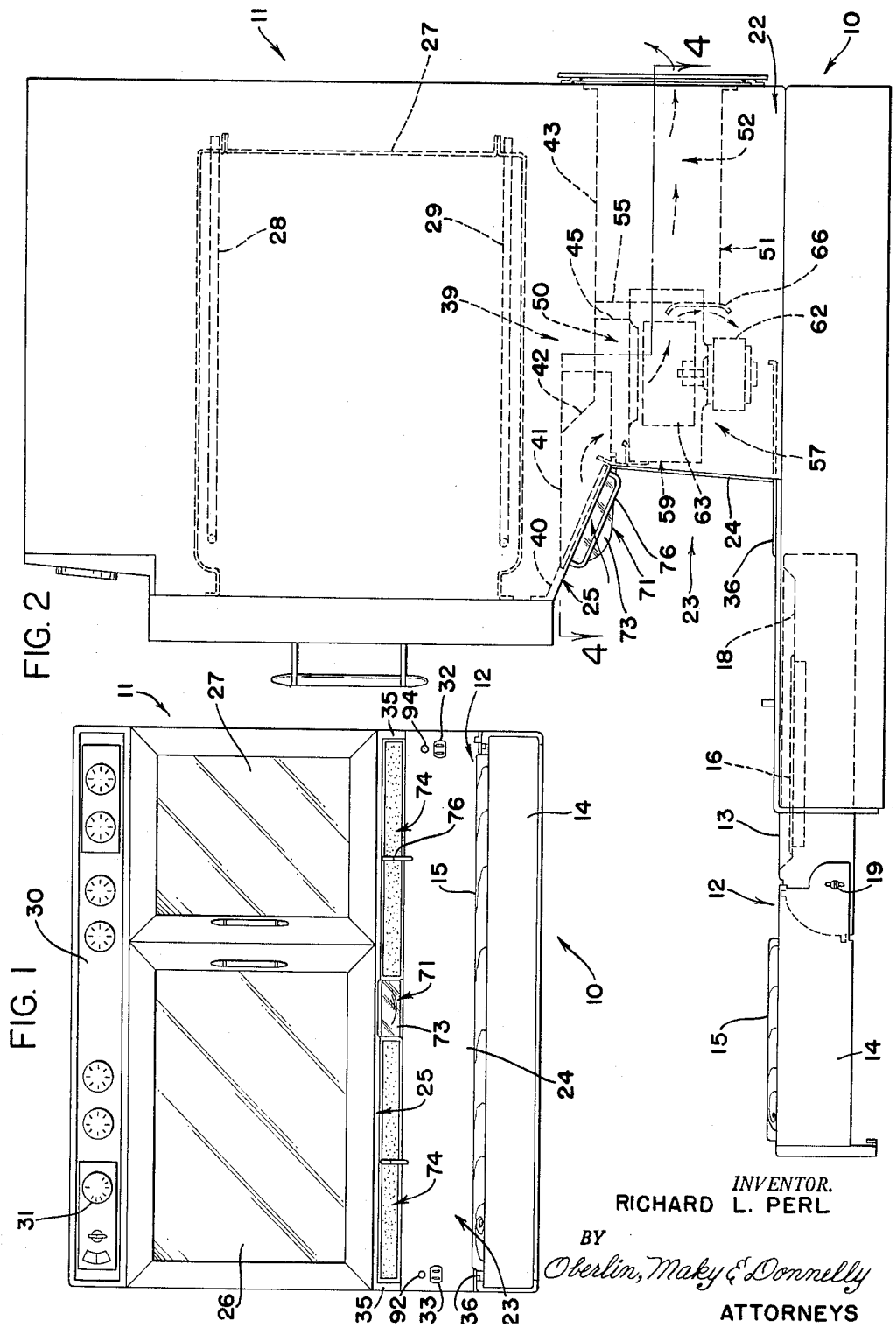

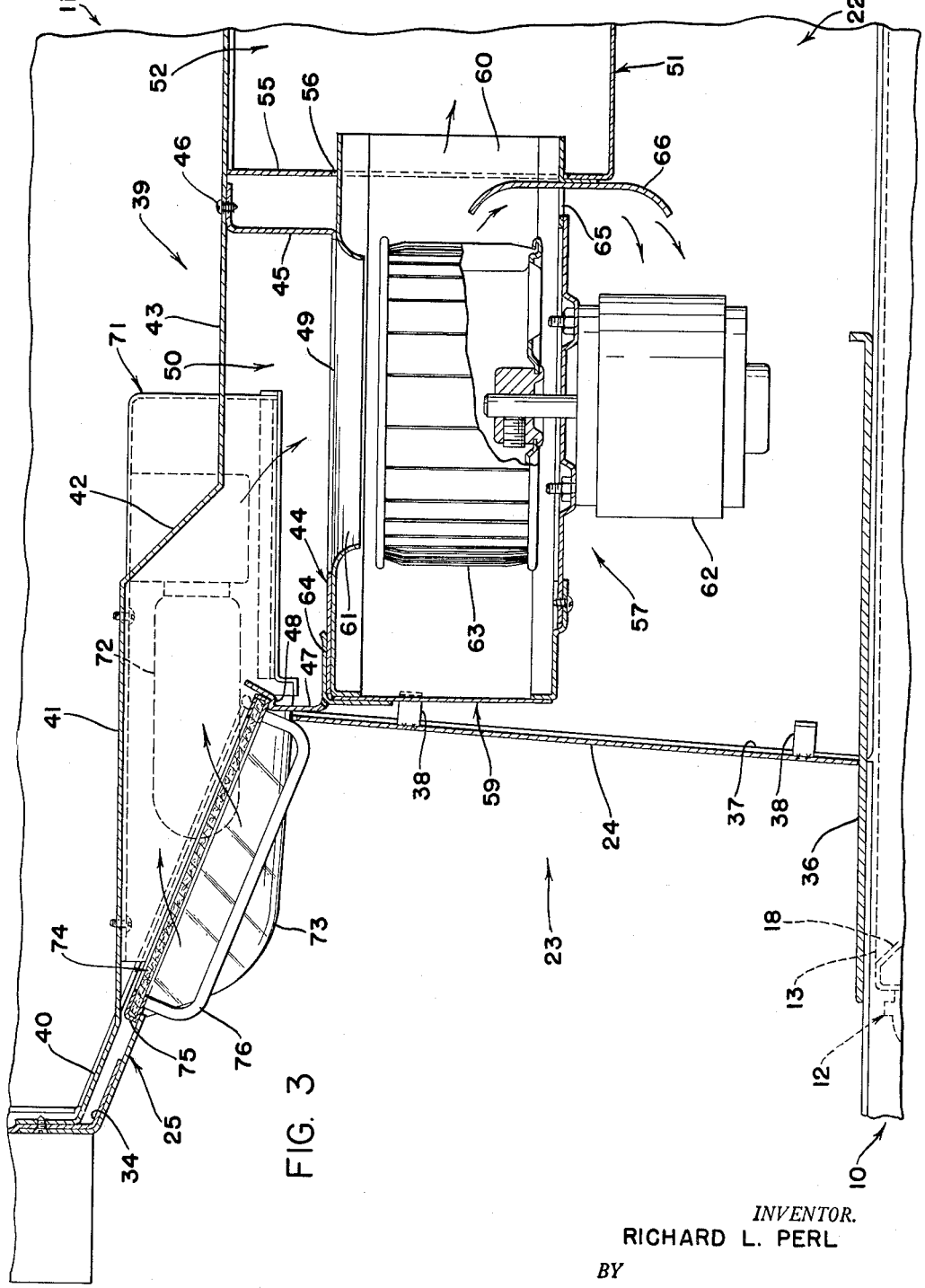

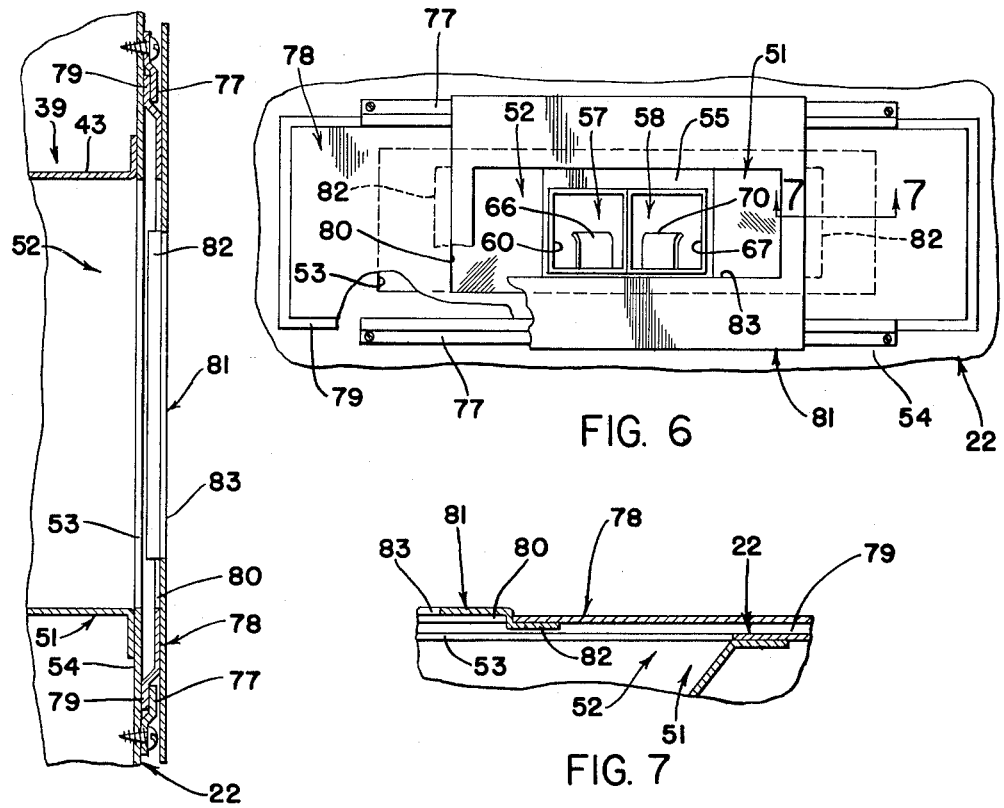
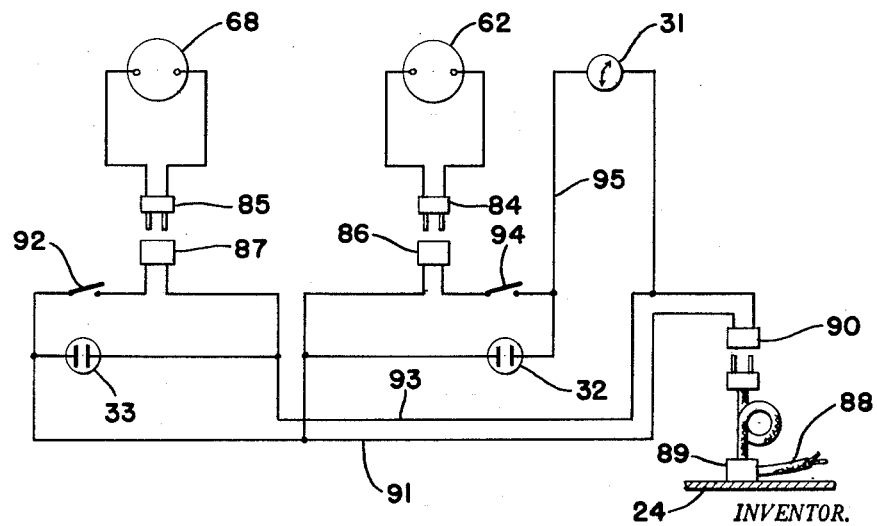

May 14, 1963   R. L. PERL   3,089,479
FORCE VENTED COOKING TOP AND OVEN
Filed Aug. 16, 1960   5 Sheets-Sheet 5

INVENTOR.
RICHARD L. PERL
BY
Oberlin, Maky & Donnelly
ATTORNEYS

United States Patent Office 3,089,479
Patented May 14, 1963

3,089,479
FORCE VENTED COOKING TOP AND OVEN
Richard L. Perl, Mansfield, Ohio, assignor to The Tappan Company, Mansfield, Ohio, a corporation of Ohio
Filed Aug. 16, 1960, Ser. No. 49,902
3 Claims. (Cl. 126—21)

This invention relates to gas exhaust means in combination with a cooking top for forcibly venting the area of the latter to collect and remove odoriferous and other gases and vapors produced in cooking thereon.

It is a primary object of the invention to provide such an exhaust in a unitary assembly, that is, with the cooking top and powered vent means in a structural, as well as a functionally related, combination, such assembly being especially suited for domestic or home installation.

Another object is to provide a cooking top vent system including a blower for establishing a zone of negative pressure above the cooking top and also serving in the system to place the interior of the top under a positive pressure, the latter characteristic resulting in definite movement of air from the interior to the exterior of the top. The top is of course here understood to comprise a box or some form of casing with heating units at the upper surface thereof, this being the common construction, and in the preferred embodiment of the invention to be hereinafter described, the top mounts a plurality of electric heating elements. With the positive pressure condition noted, air is caused to flow outwardly through and around the elements from the space therebeneath, whereby heat loss to the interior is reduced and more efficient use accordingly made of the elements.

It is a further object of the present invention to provide a vent system wherein a filter is disposed in the intake of a draft-producing blower and in which an excessive accumulation of waste and matter by the filter is indicated in the manner of operation of the system to call such condition to attention, the filter being removable for cleaning upon such occurrence.

Another object is to provide a range having the noted vent improvements incorporated therein for servicing the surface units of the range. Such range vent discharges at the rear and is adapted for connection to standard duct work extending to the outside of the dwelling in which the range is installed, and it is an additional object of the invention to provide means for adjustably positioning the terminal vent opening at the back of the range to allow for some error in positioning of the duct to be connected thereto, the latter being in the wall of the building in most cases.

It is a further object of the present invention to provide such a range in which operation of the vent system can be time-controlled, for example, to coincide with an automatically timed cooking operation carried out on the surface of the range.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a front elevation of a range equipped with the vent improvements of the present invention, this range having a cooking top in the form of a sliding drawer;

FIG. 2 is an enlarged side elevation of such range, with the cooking top drawer thereof extended;

FIG. 3 is a fragmentary vertical transverse section of the range on a further enlarged scale, the section being indicated approximately by the line 3—3 in FIG. 4;

FIG. 5 is a section taken on the line 5—5 in FIG. 4;

FIG. 6 is a fragmentary view of the back of the range;

FIG. 7 is a relatively enlarged section taken on the line 7—7 in FIG. 6;

FIG. 8 is a wiring diagram showing the electric circuits related to the vent system of the range;

Figure 4:
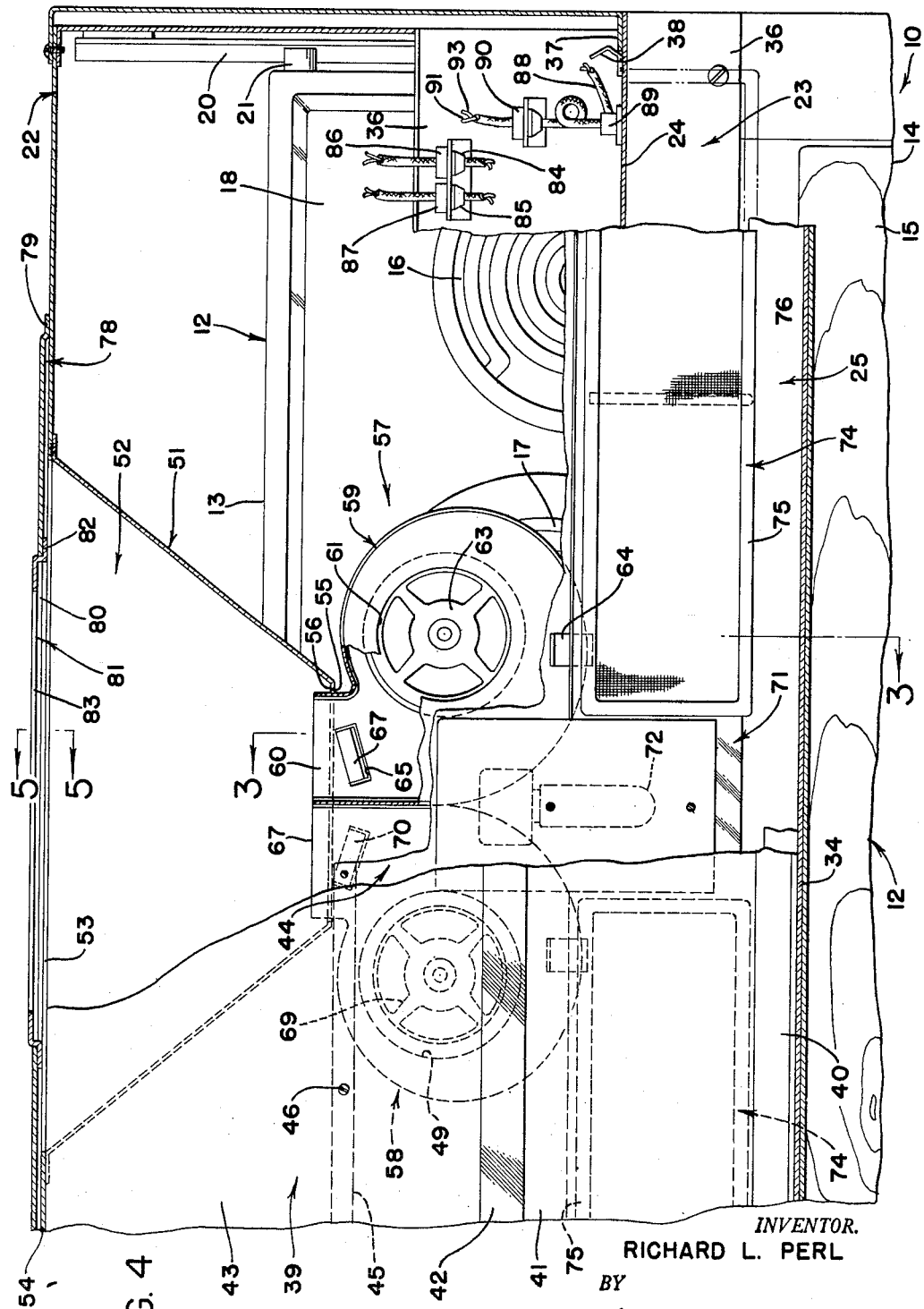
FIG. 4 is a fragmentary horizontal section through the range approximately along the line 4—4 in FIG. 2 with parts broken away.

Referring now to the drawings in detail, the illustrated range comprises a horizontal base portion and, extending upwardly over approximately the rear longitudinal half of the same, an oven portion, the two being designated generally respectively by reference numerals 10 and 11. A cooking top drawer 12 is slidable in the base portion, this drawer being shown fully extended or open in FIG. 2 and closed in FIG. 4.

In this embodiment, the drawer 12 is made up of inner and outer sections 13 and 14 hingedly interconnected at the longitudinal centerline, parallel to the front, with a wood cutting board 15 mounted in the outer section and four surface electric heating elements, two of which are shown at 16 and 17 in FIG. 4, disposed across the inner or rear section. This last section has a cover plate 18 over the same, and the surface units and their connections are conventional. It will be seen that when the drawer is closed, the surface unit assembly is beneath and thus obscured by the upstanding oven portion 11 of the range; when the drawer is pulled out, the surface units are exposed for use in a row along the front of the range, and a hinge connection 19 of the outer section 14 of the drawer permits the same to be swung downwardly to a vertical position to enhance accessibility to the surface units. Latches are provided to hold the outer cutting board section in its such adjusted positions, and the sliding support of the drawer 12 in the range base portion is provided by stationary rails 20 at the inner sides of such base and slide blocks 21, or rollers, carried at the sides of the inner drawer section 13 in engagement with such rails, the assembly being the same at both sides.

As best shown in FIG. 2, the upstanding oven portion of the range comprises a lower casing section 22 of reduced depth relative to the structural formation thereabove, thereby forming a recess indicated at 23 in FIG. 2 extending along the front above the base portion 10 and hence the cooking top. Such front recessed area is, more exactly, defined by a panel 24, which extends upwardly from the base portion at a slight rearward angle, and a frame 25 projecting forwardly and upwardly from adjacent the top of such panel. Above this plane, there are two ovens suitably mounted within the range casing, a large oven 26 being oriented to extend lengthwise from the left side of the range and a smaller oven 27 between the inner end of the large oven and the right side of the range. These ovens, with usual electric heating elements therein, have doors respectively hinged at the vertical front side edges of the range. The smaller oven is shown simply in dashed outline in FIG. 2 with upper and lower electric heating elements 28 and 29 in the same, and the doors for the two ovens are illustrated as being of the type having glass panes therein. The details of these ovens are, however, not part of the present improvements and accordingly need not be set forth. This is also true of the various controls with which the range is equipped, these being shown in simplified form as mounted in a control panel 30 which extends across the top front of the range.

For reasons which will later become clear, it will be noted that one of these controls is a clock timer 31 and, to complete the range environment, there are two convenience outlets 32 and 33 in and respectively adjacent the ends of the front lower panel 24. The outlet 32 is wired for optional control by the clock 31, according to the setting of the latter, this feature also being known in commercially available ranges.

With more particular regard now to the lower casing section 22 of the upstanding portion of the range, it has already been noted that there is an inclined frame 25 at the top of the recess 23 and accordingly above and slightly to the rear of the surface elements, such as 16 and 17, of the drawer when the same are exposed for use. As best shown in FIG. 3, this frame is secured along its forward upper edge to a structural member 34 which extends across the front of the range just below the ovens, the joint being obscured by the oven doors when closed, and from FIG. 1 it will be seen that this frame comprises such upper extent and side pieces 35 which extend downwardly and inwardly therefrom approximately to the top edge of the lower front panel 24. Accordingly, frame 25 defines a recess, in the inclined plane, running substantially fully from one side to the other of the range.

Also extending across the front of the range, there is a horizontal plate 36 bridging the sides of the base portion 10 a short distance forwardly of the panel 24 and extending inwardly beneath the lower edge of the latter within the casing section 22. The substantially vertical edges of the respective sides of this casing portion are turned inwardly, as shown at 37, for backing and removable attachment of the panel 24. Such attachment is here shown as accomplished by means of spring clips 38 secured to the inner surface of the panel 24 and resiliently engaged about the edges of the backing flanges 37 at each side. The lower front panel 24 can thereby readily be withdrawn for access to the interior of this portion of the range.

An upper partition, designated generally by reference numeral 39, forms an internal top closure for the casing portion 22, this partition being secured at the front to the transverse structural member 34 and extending to the rear wall of the range from one side to the other thereof. With particular reference to FIG. 3, partition 39 more particularly comprises a forward section 40 spaced inwardly in approximately parallel relation to the top of the front frame 25, a horizontal section 41 commencing approximately above the lower edge of such frame, a more sharply inclined section 42 well behind the plane of the front panel 24 and hence the inner ends of frame 25, and finally a horizontal section 43 which extends to the rear wall. A lower partition 44 is disposed transversely in spaced relation beneath the partition 39 and has a rear wall 45 attached to the section 43 of the latter, as shown at 46, and a front flange 47 which bridges between the range sides behind the upper end portion of the front panel 24. This flange has an inwardly offset edge portion forming a ledge 48 which extends across the front of the range at the lower ends of the side pieces 35 of the frame 25 and thus in the inclined plane of such frame.

The partition 44 is further provided with a pair of circular bottom openings 49 spaced to either side of center, and it will be seen that the frame 25 and the front flange 47 of the lower partition define an elongated opening which leads to an inner manifold 50 formed by the partitions 39 and 44. Such opening and communicating manifold extend for substantially the full range width, and the manifold is closed except for the noted circular bottom openings 49.

A channel 51 having diverging sides is secured to the underside of the upper partition section 43 to form therewith a duct 52 of rearwardly increasing cross-sectional area having its smaller end spaced slightly behind the inner wall 45 of the manifold 50 and its larger end embracing a rectangular opening 53 of corresponding size provided in the rear range wall 54. This duct is closed at its such inner end by a vertical wall 55 having an opening 56 therein.

Two blower units 57 and 58 are removably mounted between the manifold and the duct, with each drawing air through one of the openings 49 of the former and discharging it to the latter. The blower unit 57 comprises a scroll housing 59 with an outlet section 60 at the left, as viewed from the top, for example, in FIG. 4. The top wall of such housing is formed with an intake opening 61 which registers with the associated bottom opening 49 of the manifold 50 and its outlet section is inserted in the opening 56 of the end wall 55 of the duct 52, with such section being approximately half the width of the duct opening. An electric drive motor 62 is secured externally to the bottom wall of the housing, with its shaft extending vertically into the same and there supporting an air rotor 63.

This blower unit, in which the rotor 63 turns in a clockwise direction, is removably supported in such assembled condition by means of a clip 64 which engages through a slot near the front of the manifold partition 44 and by the fit of its outlet 60 in the end opening of the discharge duct 52. Near the blower outlet, the bottom wall of the housing is provided with an angle slot 65, and a vertical deflector 66 is fixed in such slot with its ends curved and respectively within and without the housing. Accordingly, a portion of the blower discharge is deflected downwardly, as indicated by the arrows in FIG. 3, into the range casing section 22 below this assembly.

The blower unit 58 is similarly constructed and supported, but is designed for counterclockwise rotation with its outlet 67 occupying the remaining half of the opening 56 in the discharge duct 52. This second blower thus also has an electric drive motor 68, rotor 69 and a deflector 70, the latter corresponding to the deflector 66 of the first blower unit in location and function. As shown in FIG. 4, the two blower units are in symmetrical arrangement with their straight outlet side wall portions in contact.

A lighting fixture 71 is supported centrally within the manifold 50 and contains a bulb 72, with a translucent globe 73. Such globe, and a portion of the bulb, extend outwardly through the inclined plane of the frame 25 and of course forwardly of the generally vertical front panel 24 for illumination of the cooking surface respectively below and forward of such members or, in other words, the recess 23 at the front of the range.

Such fixture interrupts the opening defined largely by frame 25, so that there are two intake openings for the manifold 50 respectively to either side of the fixture. Since the latter is not of substantial width, the total intake area is not materially reduced. A filter 74 made of suitable heat-resistant material, for example a mat formed of twisted metal strips, is removably mounted in each such intake opening, each filter comprising a peripheral frame 75 and a transverse centered handle 76. As will be most easily understood from FIG. 3, the transverse dimension of such filters is slightly greater than the distance between the inner free edge of the top of the frame 25 and the opposed inner ledge 48. Such a filter is placed in its intake opening in the range by tipping the same while moving the upper edge of its frame behind the frame 25 and then bringing the lower edge of the filter frame upwardly and inwardly to rest on the ledge 48. Both filters are thus supported cooperably by such ledge and frame 25 and are easily removable for convenient separate cleaning, for example, in a sink.

At the back of the range, at the areas of the exhaust opening 53 therein, horizontal rails 77 are secured to the outside of the rear wall 54 respectively to be above and below the top and bottom of the opening 53 in parallel relation. An elongated plate 78 having a peripheral flange 79 of general L-shape is slidably supported by such rails, with its top and bottom flanges engaged behind the latter and the main body of the plate thereby being slightly offset outwardly from the back wall 54 of the range. The plate 78 has a rectangular opening 80 therein of larger size than the opening 53 in the rear wall of the range, and a vertically adjustable plate 81 is carried by such first plate 78. The plate 81 is approximately of the width of the opening 80 in the plate 77 and has out-turned and inwardly offset tabs 82 which engage about and behind the vertical edges of the opening 80. Since these tabs are of less height than that of the plate opening 80, it will be clear that plate 81 may be adjusted vertically relative to its carrying plate 78, the tab engagement providing such support of the former on the latter. The outer plate 81 has an opening 83 therein which is of the same size as the exhaust opening 53 in the range wall 54, and the combination of the two plates thus provides a transition, whereby the effective exhaust opening from the range can be adjusted within limits vertically and to either side. There is accordingly provided a measure of flexibility which is significant and beneficial in connecting the range to wall ducting and the like leading to an external vent, such venting being preferable.

To facilitate the aforementioned removal of the blower units, the motors 62 and 68 thereof are respectively connected by electric cords 84 and 85 to conventional sockets 86 and 87 mounted on the stationary bottom plate 36 within the range casing section 22. These sockets are preferably wired as shown in FIG. 8, and it will be seen that the electric energy supply here is provided by a cord 88 which passes through a clamp block 89 secured to the inside of the removable front panel 24 and then to a plug connection with a stationary socket 90 likewise on the plate 36. From this supply socket, wire 97 leads to a switch 92, accessible at the left front of the range as shown in FIG. 1, in series with the socket 87 for the motor 68 of the left blower unit, with this blower energization circuit being completed by the wire 93 to the other side of the supply socket. The left convenience outlet 33 is connected in parallel in this described circuit. The socket 86 of the second or right blower motor 62 is connected from the wire 91 in series with the right front located switch 94 and a circuit 95 through the clock timer 31 to the supply conductor 93. The right convenience outlet 32 is in parallel with the motor 62 and switch 94 part of such circuit.

It will be understood that the clock timer 31, of conventional type, is accordingly in series with both the right blower motor 62 and the right convenience outlet 32, and that this connection will normally be closed through the clock contacts. However, by setting the clock in appropriate manner for timed operation of the convenience outlet 32, the blower motor 62 can be correspondingly scheduled by closure of its switch 94. For example, if a separate appliance is placed on the cooking top and plugged into the outlet 32 for operation at some future time, the blower switch 94 can also be closed, whereby the blower servicing this side of the range top will be automatically timed. It is, of course, apparent that the two blowers can be operated either simultaneously or separately, with each servicing two of the four surface units or approximately half the width of the range top.

It will also be noted that there is a certain amount of slack in the supply cord 88 between the clamp block 89, which secures the engaged portion of such cord against the inside of the range front panel 24, and the supply socket 90 to which the cord end is removably connected. Panel 24 is removable by pulling the same to the front, to free the snap fasteners 38, and the noted slack in the cord 88 is adequate to permit the panel to be withdrawn sufficiently for hand entry and safe disconnection of such cord from the socket 90, whereupon the panel can be further withdrawn completely to expose the interior of this section 22 of the range. The blower units can obviously be readily individually withdrawn, after cord disconnection, by simply grasping the housing of the one to be extracted and sliding the same forwardly to clear its front support clip and its outlet, the latter from the end of the exhaust duct, so that cleaning and servicing of such units is greatly facilitated.

The removability of the filters has already been discussed, and the noticeably loose support thereof has made it possible to provide a means of reminding the housewife that the filters should be kept reasonably clean for best efficiency. This feature is realized by weighting the filters, for example, by their handles, in relation to the normal differential in air pressure thereacross, such that a predetermined increase in this drop across either filter causes the same to be lifted from its support surfaces. That is, when a filter becomes clogged to the point where it should be cleaned, and the blower associated therewith is turned on, the filter will actually snap upwardly in its mounting, thereby visually and audibly as well signalling such condition of the filter. This upward movement of a filter is of course limited and, when the blower is turned off, the filter will fall back into place.

The range will thus be seen to comprise a built-in exhaust system for venting the cooking top thereof, with twin exhaust blowers or fans operating to remove all traces of cooking odors. These vents may be used separately or simultaneously and, in the preferred embodiment, one can be automatically timed and conditioned for future programming, further to increase the flexibility of the exhaust system.

Furthermore, the blower units are operative by virtue of the diversion orifices and deflectors 66 and 70 in their respective outlets to force a certain amount of air downwardly into the lower portion 22 of the range below the main exhaust assembly. These air currents proceed, with the surface unit drawer 12 open, outwardly to the interior of the rear or cooking section 13 of the drawer and upwardly through the top electric heating elements thereon which form the surface units. Accordingly, the interior of the cooking top when exposed for use can be maintained under positive pressure, and it will be clear that the resulting outward flow of air through the heating units reduces, to substantial elimination, loss of heat therefrom to the interior of the box or drawer. Substantially all of the heat produced is directed against cooking utensils on the operative elements, with consequent obvious increase in the efficiency of the desired heating operation.

In the foregoing discussion of automatically timed control of at least a portion of the new exhaust system, such control has been related to use of a separate appliance energized by means of a time-controlled convenience outlet, a more specific illustration of which would be control of an automatic coffee maker supported on the outer section of the drawer, when the latter is closed, at this side of the range and accordingly beneath the intake leading to the blower at the same side. The blower operation, as here shown, is incidentally independent of the position of the drawer in this embodiment. The concept of such timed control of one or both of the blowers is, however, understood to be applicable as well to a construction in which one or more of the regular surface units is wired for timer control, that is, the blower operation could be related to a surface unit of this type in the same manner.

Figure 9:
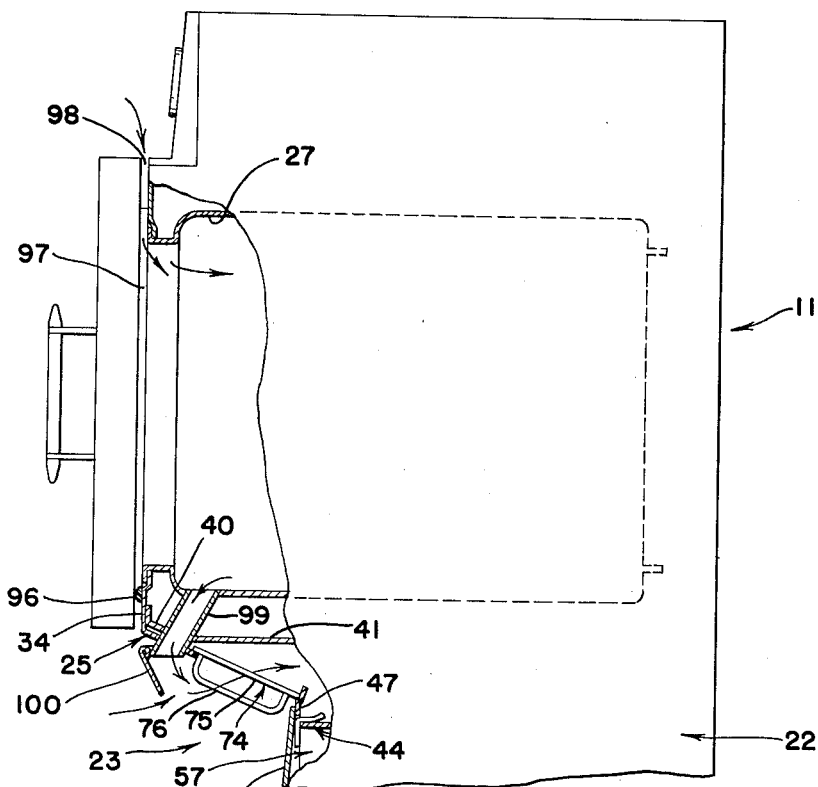
FIG. 9 is a side elevation of the range, partially broken away, with additional venting provided for the ovens.

In a range combination, such as shown, the described exhaust system can also be utilized to induce circulation of ambient air through the ovens as illustrated in FIG. 9 in connection with the oven 27. A first door seal 96 is provided along the bottom of the open front of the oven and similar seals, one of which is shown at 97, are arranged to extend along the vertical sides of the oven opening, with the several such seals engaged by the oven door when closed. There is no seal across the top of the oven front and, accordingly, there is a slight separation, shown exaggerated at 98, between the top of the door and oven.

An outlet 99, of suitable size and shape, is provided in a lower front portion of the oven wall and extends therefrom outwardly through the front of the range just above the exhaust system opening in which the filter 74 is normally disposed. The lower exposed end of this outlet is in a substantially horizontal plane, as shown, and a hinged closure 100 is provided therefor, with such closure being manually adjustable between a closed position against the end of the outlet 99 and the open position illustrated in which the cover extends downwardly and inwardly at an angle from the front edge of the outlet. Accordingly, when the blower 57 at the right side of the range is operative, the inward rush of air thereto is sufficient to draw air through the outlet from the interior of the oven and the latter is replenished by ambient air which enters through the small gap provided along the top of the closed oven door, such flow being indicated by the arrows in FIG. 9.

It will be understood that the oven 26 will be similarly provided with door seals at the bottom and both sides, with admittance of ambient air at the top, and a like forward outlet in the same operative relationship to the other blower of the exhaust system. The oven-air outlets are thus respectively directed toward the front intake openings of the range, with other baffling or shaping of the outlets capable of employment in lieu of the hinged closures illustrated to provide the desired proximate relation of the terminal ends of the outlets and the intake openings, which is obviously important for efficient utilization of the blowers for the further purpose of ambient air circulation through the ovens. Since the blowers are individually controlled, air may be circulated through one or both ovens as desired and, by virtue of the oven outlet closures, the blowers can be used as desired solely for purposes of venting the cooking top. It will be obvious that the air exhausted from the ovens must pass through the filters, whereby the latter are effective in all uses of the exhaust system.

Figure 10:
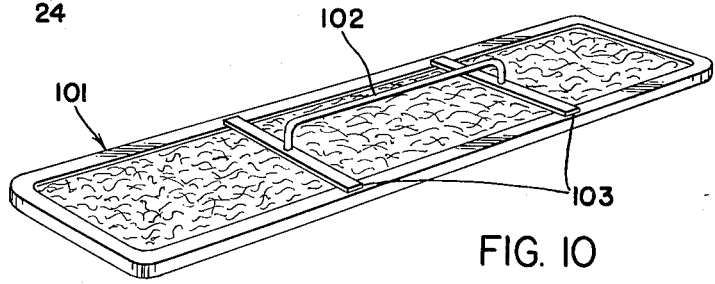
FIG. 10 is a perspective view of a slightly modified form of filter.
Figure 11:
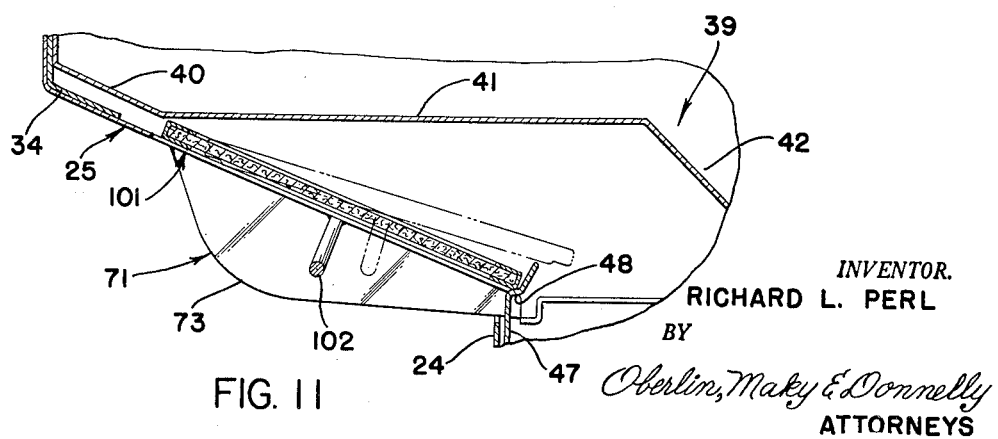
FIG. 11 is a fragmentary sectional view showing the manner in which such modified filter is supported and operative in the range.

The filter 101 illustrated in FIG. 10 differs from the one previously described by having a handle 102 disposed and supported by cross members 103 to extend longitudinally of the filter body, rather than transversely. By reason of this modified handle arrangement, the side edges of the filter are not in any way obstructed by the handle and, consequently, when the filter is mounted in its range opening as shown in FIG. 11 the filter is free to shift bodily upward and inwardly to move at its inner edge over the top of the ledge supporting member 48. When a filter of this construction becomes excessively clogged, it is lifted by the blower produced suction to such position, as shown by the dashed lines in FIG. 11, whereby the filter is actually held in obviously displaced condition. Instead of simply being lifted, and dropped when the blower is turned off, a clogged filter is hung up in this manner further to indicate that the same should be removed and cleaned.

As also indicated in FIG. 11, by the clearance between the front edge of the filter 101 and the inner edge of the member 25, each filter can be held in its opening by overlapping its ends on the range side trim and the center globe device respectively adjacent thereto, with support on the ledge 48 as before. That is, the ends of the filter instead of the forward upper edge can thus be used for the added support, in which case the filter is inserted and removed by inward and endwise movement to clear the angle rest surfaces at the ends of the same. Other handle and support arrangements obviously might be used to provide such separable mounting and suction induced displacement of the filters.

Other modes of applying the principle of the invention may be employed, change being made as regards the details described, provided the features stated in any of the following claims or the equivalent of such be employed.

I, therefore, particularly point out and distinctly claim as my invention:

1. In a kitchen range, an enclosure, an oven having a vertically disposed front door mounted in the upper portion of said enclosure, drawer structure in the lower portion of the enclosure, with an intermediate portion of the enclosure between said oven and said drawer structure, a cooking top assembly including surface heating units carried by said drawer structure for in and out movement, heating units of the cooking top assembly being exposed forwardly of the front of the intermediate portion of the enclosure when the assembly is in condition for use, an intake opening being provided at the front of said intermediate portion of the enclosure and adjacent the vertical plane of the door at an elevation above the exposed heating units, exhaust means including a fan located within said intermediate section and operative to draw air inwardly through said intake opening, discharge duct means extending from said fan to a rear outlet provided in the enclosure, filter means removably supported over said intake opening, and control means for the fan accessible at the front of the enclosure.

2. In a kitchen range, an oven having a door at the front, seal means interposed between said door and oven at the bottom and sides of said oven thereby sealing said oven at said sides and bottom when said door is in a closed position, said door being spaced slightly outward from said oven at the top thereof when said door is in such closed position, with such top space providing communication between the exterior and interior of the closed oven, fan means in exterior association with the oven, air-conducting means extending from the interior of the oven to a point adjacent the flow of intake air produced by operation of said fan means, whereby air can be aspirated from the oven when said door is closed through said air-conducting means by operation of said fan means, and means for opening and closing said air-conducting means to control such aspirating effect of the fan means on the oven.

3. In a cooking top assembly including enclosure means having a top surface, and electrical heating means disposed generally in an aperture provided therefor in said surface for surface element cooking; an exhaust system for said cooking top having an inlet positioned above said surface and generally adjacent thereto, blower means in said exhaust system disposed and operative to draw air inwardly through said inlet, means for conducting the main discharge flow from said blower means to a removed outlet, the blower means thereby serving forcibly to vent the area above the heating means by removal and discharge through said outlet of cooking vapors and the like produced by surface cooking with said heating means, and means for diverting and conducting a portion of the main discharge flow of the blower means proceeding from the inlet to the outlet of the exhaust system to the interior of the cooking top assembly beneath said surface in which the heating means is disposed, the aperture in said surface and the heating means being so constructed and arranged as to provide outflow of air therethrough, whereby the diverted forced flow from the main discharge of the blower means is circulated through the cooking top assembly and outwardly therefrom at the occurrence of the heating means.

References Cited in the file of this patent

UNITED STATES PATENTS

| | | |
|---|---|---|
| 410,660 | Turner | Sept. 10, 1889 |
| 827,603 | Quette et al. | July 31, 1906 |

(Other references on following page)

UNITED STATES PATENTS

| | | |
|---|---|---|
| 1,397,471 | Walker | Nov. 15, 1921 |
| 2,530,159 | Esson | Nov. 14, 1950 |
| 2,584,613 | Pledger | Feb. 5, 1952 |
| 2,586,023 | Gillette | Feb. 19, 1952 |
| 2,674,991 | Schaefer | Apr. 13, 1954 |
| 2,825,500 | McLean | Mar. 4, 1958 |
| 2,862,437 | Smith et al. | Dec. 2, 1958 |
| 2,893,305 | Jenson et al. | July 7, 1959 |
| 2,905,073 | Aveni | Sept. 22, 1959 |
| 2,919,340 | Jacobs | Dec. 29, 1959 |
| 2,972,036 | Pollock et al. | Feb. 14, 1961 |

FOREIGN PATENTS

| | | |
|---|---|---|
| 449,733 | Great Britain | July 2, 1936 |